(12) United States Patent
Wiese et al.

(10) Patent No.: US 12,021,379 B2
(45) Date of Patent: Jun. 25, 2024

(54) ELECTRONIC DEVICE AND COMMUNICATION UNIT

(71) Applicant: WAGO Verwaltungsgesellschaft mbH, Minden (DE)

(72) Inventors: Janik Wiese, Petershagen (DE); Stefan Oroel, Minden (DE); Philipp Neugebauer, Bueckeburg (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 456 days.

(21) Appl. No.: 17/484,837

(22) Filed: Sep. 24, 2021

(65) Prior Publication Data

US 2022/0014040 A1    Jan. 13, 2022

Related U.S. Application Data

(63) Continuation of application No. PCT/EP2020/058145, filed on Mar. 24, 2020.

(30) Foreign Application Priority Data

Mar. 27, 2019    (DE) .................... 20 2019 101 745.7

(51) Int. Cl.
*H02J 13/00*    (2006.01)
*G05B 19/042*    (2006.01)
*H04L 12/40*    (2006.01)

(52) U.S. Cl.
CPC ...... *H02J 13/00016* (2020.01); *G05B 19/042* (2013.01); *H02J 13/00036* (2020.01);
(Continued)

(58) Field of Classification Search
CPC ........... H02J 13/00016; H02J 13/00036; H02J 13/0005; G05B 19/042;
(Continued)

(56) References Cited

U.S. PATENT DOCUMENTS 9,083,548 B2   7/2015  Holmes et al.
11,063,916 B1 *  7/2021  Ferreira ............... G05B 19/054
(Continued)

FOREIGN PATENT DOCUMENTS

CN    1455566 A    11/2003
CN   101685306 A    3/2010
(Continued)

OTHER PUBLICATIONS

International Preliminary Report on Patentability dated Sep. 28, 2021 in corresponding application PCT/EP2020/058145.

*Primary Examiner* — Charles Cai (74) *Attorney, Agent, or Firm* — Muncy, Geissler, Olds & Lowe, P.C.

(57) ABSTRACT

An electronic device that has control electronics that have at least one program memory with a computer program stored therein and a processor for executing the computer program. The computer program has software control functions for controlling functions of the electronic device. The electronic device has at least one communication unit coupled to the control electronics, by means of which the electronic device is equipped for data communication with an external computer device. The communication unit is designed as a replaceable communication module. The communication module has a gateway functionality via which a bidirectional conversion takes place between an external communication protocol and/or physical layer used by the external computer device and an internal communication protocol and/or physical layer used between the communication module and the processor. The communication module supports either exactly one external communication protocol or multiple external communication protocols.

14 Claims, 2 Drawing Sheets

(52) U.S. Cl.
CPC .......... *H02J 13/0005* (2020.01); *H04L 12/40* (2013.01); *G05B 2219/21154* (2013.01)

(58) Field of Classification Search
CPC .......... G05B 2219/21154; H04L 12/40; H04L 12/4625; H04L 12/40006
See application file for complete search history.

(56) References Cited

U.S. PATENT DOCUMENTS

| | | | |
|---|---|---|---|
| 2008/0013569 A1 | 1/2008 | Boren | |
| 2010/0122091 A1* | 5/2010 | Huang | H04L 9/3226 713/171 |
| 2010/0205307 A1 | 8/2010 | Sarugai | |
| 2011/0283027 A1* | 11/2011 | Buesching | H04L 12/40032 710/105 |
| 2012/0014395 A1* | 1/2012 | Komatsu | H04L 69/18 370/467 |
| 2012/0254377 A1* | 10/2012 | Bernhard | H04L 47/10 709/220 |
| 2013/0091308 A1 | 4/2013 | Cha et al. | |
| 2014/0226460 A1 | 8/2014 | Kretschmann et al. | |
| 2015/0109812 A1* | 4/2015 | Greb | H05K 7/1481 362/555 |
| 2016/0103436 A1* | 4/2016 | Buda | G05B 19/0426 700/22 |
| 2018/0013582 A1 | 1/2018 | Sotriffer et al. | |
| 2018/0054511 A1 | 2/2018 | Antonopoulos et al. | |
| 2018/0276166 A1* | 9/2018 | Jerolm | G06F 13/102 |
| 2019/0079842 A1 | 3/2019 | Chae et al. | |
| 2019/0391548 A1 | 12/2019 | Klimmek | |
| 2021/0199334 A1* | 7/2021 | Tan | F24F 11/89 |
| 2021/0278257 A1* | 9/2021 | Dharia | G06V 20/56 |

FOREIGN PATENT DOCUMENTS

| | | |
|---|---|---|
| CN | 102365844 A | 2/2012 |
| CN | 103036862 A | 4/2013 |
| CN | 109271336 A | 1/2019 |
| DE | 102017103554 B3 | 5/2018 |
| WO | WO2008097992 A1 | 8/2008 |

\* cited by examiner

ELECTRONIC DEVICE AND COMMUNICATION UNIT

This nonprovisional application is a continuation of International Application No. PCT/EP2020/058145, which was filed on Mar. 24, 2020, and which claims priority to German Patent Application No. 20 2019 101 745.7, which was filed in Germany on Mar. 27, 2019, and which are both herein incorporated by reference.

BACKGROUND OF THE INVENTION

Field of the Invention

The present invention relates to an electronic device. The electronic device can be an electrical energy supply device for supplying electrical energy to electrical components from an energy source and/or an electronic circuit breaker, for example. The invention relates, in particular, to the field of electronic devices for industrial systems, in particular for industrial controllers such as, e.g., programmable control systems. The invention also relates to a communication unit of an electronic device and a product line with multiple communication modules.

Description of the Background Art

An energy supply device serves to provide electrical energy at a specific voltage level, for example 12 volts or 24 volts, and of a specific voltage type, for example DC, wherein the energy supply device provides this electrical energy supply from, e.g., a power grid, such as an AC power grid. For this purpose, the electronic device has appropriate components for conversion and/or rectification of the electrical energy provided by the power grid, for example in the form of a clocked conversion circuit when a switched-mode power supply is involved, and/or at least one transformer.

In the field of industrial power supply, stringent requirements apply to the reliability and functionality of such electronic devices.

SUMMARY OF THE INVENTION

It is therefore an object of the present invention to provide a further improved electronic device.

To attain this object, the electronic device can have control electronics that have at least one program memory with a computer program stored therein and a processor for executing the computer program. The computer program has software control functions for controlling functions, such as power supply functions, of the electronic device. In this way, the electronic device can be realized with a multiplicity of functions, which can each be implemented in software. The electronic device is also update-capable as a result, which is to say an improved computer program can be entered without changing the hardware.

The electronic device can have a parameter memory, in which parameters can be stored for defining the functionality of the electronic device. By means of such parameters, specific details of the functions of the electronic device can be set by the user as needed and matched to a given application.

The electronic device can have at least one communication unit coupled to the control electronics, by means of which the electronic device is equipped for data communication with an external computer device. In this way, a data exchange is possible between the external computer device and the electronic device, for example in order to read out operating data of the electronic device or to set and/or to control specific functions of the electronic device through the external computer device. Moreover, the storage of variable parameters in the electronic device is possible when it has a parameter memory.

The external computer device can be any processor, such as a laptop or a PC, for example. The external computer device can also be a control unit of a programmable control system or another device of such a programmable control system. The external computer device can be a device connected to a data bus. For this purpose, the electronic device can be coupled to the data bus through the communication unit.

Provision can be made that the communication unit is designed as a replaceable communication module, wherein the communication module has a gateway functionality by means of which a bidirectional conversion takes place between an external communication protocol and/or physical layer used by the external computer device and an internal communication protocol and/or physical layer used between the communication module and the processor, wherein the communication module supports either exactly one external communication protocol or multiple external communication protocols. The communication module thus operates with the internal communication protocol and/or physical layer in the direction of the processor of the electronic device and with the external communication protocol and/or physical layer in the direction of the external computer device. By means of the gateway functionality, the communication module can perform a conversion from the external communication protocol into the internal communication protocol as well as the reverse from the internal communication protocol into the external communication protocol. The same applies to the conversion between the internal physical layer and the external physical layer. In this context, "physical layer" is understood to mean the physical layer in the OSI layer model.

This has the advantage that the communication module and thus its gateway functionality and in particular the external communication protocol and/or physical layer that is supported can be swapped out in a simple manner by the means that one communication module is removed from the electronic device and another communication module is connected to the electronic device. In this way, the electronic device can be matched to different external communication protocols and/or physical layers without a great deal of effort. The internal communication protocol can be, e.g., any fieldbus communication protocol, such as Modbus RTU.

Another advantage of such a modular communication concept is that the very same communication module can be used for a particular electronic device at first and then at a later point in time can be used for a different electronic device or some other device. The costs connected with the communication interface accordingly are not associated with the electronic device or other device, but instead with the communication module.

Provision can be made that the external communication protocol is a bus protocol or a P2P protocol that supports the data communication of multiple external computer devices connected to a common data bus. This has the advantage that the electronic device can be made bus-capable by the communication module. The external communication protocol can be, e.g., any fieldbus communication protocol, such as IO-Link, Ethernet/IP, EtherCAT, Interbus, Safety-BusP, Profibus, Sercos, Modbus RTU, and the like.

The communication module can be equipped to perform cyclic communication and/or acyclic communication with the processor of the electronic device.

Provision can be made that the communication module is equipped to read out an identifier specifying the device type of the electronic device from the control electronics of the electronic device through the internal communication protocol and to transmit it to the external computer device through the external communication protocol. This has the advantage that, especially in a data transfer environment with multiple communication participants, for example when the communication module is connected to a data bus, the electronic device can always make itself known as such an electronic device, regardless of the internal and external communication protocols in use. In this way, the electronic device can be identified as such an electronic device by other data transfer participants regardless of the communication module that is plugged in at the time.

Provision can be made that the communication module is equipped to convert a command for block parameterization of the control electronics received from the external computer device through the external communication protocol into the internal communication protocol so that the control electronics, in particular the parameter memory thereof, can be written with a multiplicity of parameters by means of the command for block parameterization. In this way, the new parameter set can be activated collectively. This has the advantage that the electronic device can be parameterized in a "block" with such a block parameterization by means of the command received through the external communication protocol even when an internal communication protocol is used that in and of itself does not recognize an equivalent command for block parameterization, which is to say that a multiplicity of parameters can be transferred quickly and easily with a single command and stored in the electronic device.

Provision can be made that the communication module is equipped to convert a data storage command received from the external computer device through the external communication protocol into selected functions of the internal communication protocol, in multiple steps if necessary, wherein parameter data of the control electronics are read out by the communication module and transferred to the external computer device and/or parameter data from the external computer device are written into the control electronics through the communication module. In this way, the electronic device can also be made suitable for an externally received data storage command, even when the internal communication protocol does not recognize an equivalent such command. The received data storage command is then converted by the communication module into existing, selected functions of the internal communication protocol, which can take place in multiple steps if necessary, which is to say through multiple functions of the internal communication protocol executed step by step, one after the other. By means of the data storage command, a current parameter set of the control electronics of the electronic device can be read out and transferred to the external computer device, where the parameter set can then be stored. A reparameterization of the electronic device can then take place, for example in that a new parameter set is transferred to the control electronics by means of a command for block parameterization. In particular, a backup functionality for a parameter set of the electronic device can be realized through the communication module by means of the data storage command.

Provision can be made that the communication module has or permits password protection, so that an external computer device communicating with the electronic device through the communication module must perform a password authentication at least when accessing certain functions of the control electronics. In this way, increased security is provided with respect to incorrect operation and, in particular, against manipulation of the electronic device. This increased security is realized through password protection in the communication module, by which means any unauthorized access to at least certain functions of the control electronics is prevented. The external computer device must first perform a password authentication, which is to say transfer a correct password to the communication module, before the communication module grants access to certain functions of the control electronics.

The electronic device can be designed as an electrical energy supply device for supplying electrical energy to electrical components from an energy source and/or as an electronic circuit breaker. The electrical energy supply device can be designed as a power supply unit, for example as a power supply unit of an industrial controller, in particular of a programmable control system, as a switched-mode power supply, and/or as an uninterruptible power supply (UPS). This has the advantage that the electronic device can be realized in an extremely wide variety of versions. The same modular communication concept with the replaceable communication modules can be used in each case here. In other words, the communication modules can be used regardless of the manner of implementation of the electronic device. The identifier that can be read out from the control electronics of the electronic device, which specifies the device type of the electronic device, can have a distinction in this regard between an electronic device of an industrial controller, of a switched-mode power supply, and/or of an uninterruptible power supply, for example.

The communication module can be plugged into a housing of the electronic device from outside by means of an electrical plug-and-socket connection. This permits easy replacement of the communication module as well as easy mounting of the communication module without tools. The communication module can have, e.g., latching elements with which the communication module latches onto the housing of the electronic device, in this way being fixed in place on the housing of the electronic device.

The communication module can have a separate control processor, which executes a computer program stored in the communication module. In this way, efficient conversion between the external communication protocol and the internal communication protocol, in particular, can be accomplished, particularly when this necessitates a certain computational effort and/or memory requirement. The communication module can also be designed without a separate control processor, which is advantageous, for example, when the external communication protocol is identical to the internal communication protocol or differs only negligibly from it. For example, in such cases the communication module can merely have a hardware-based matching circuit, for matching of voltage levels of the physical layer for example.

The electronic device can have a hardware-based detection circuit, by which means the control electronics can detect whether a communication module with a separate control processor or a communication module with no separate control processor is connected to the electronic device. This has the advantage that the electronic device can determine automatically with little effort which type of communication module is connected to the electronic device. Accordingly, the electronic device can automatically match its communication functions to the communication module that is connected at the time. In the case of communication modules with no separate control processor, the processor of the electronic device can take on certain control functions of the communication module, such as driving a control input of the communication module for setting the data transfer direction.

The electronic device can be equipped for replacement of the communication module in ongoing operation (hot plugging). As a result, flexibility of the matching of the electronic device to different requirements is further improved. The electronic device can be equipped in this case to automatically match changed interface parameters of its communication interface to the communication module after replacement of the communication module. The matching of the communication parameters can also be requested by the newly plugged-in communication module.

The above-mentioned object is also attained by a communication unit of an electronic device of the type described above. In this case the communication unit is designed as a replaceable communication module, wherein the communication module has a gateway functionality by means of which a bidirectional conversion takes place between an external communication protocol and/or physical layer used by the external computer device and an internal communication protocol and/or physical layer used between the communication module and the processor, wherein the communication module supports either exactly one external communication protocol or multiple external communication protocols. The advantages explained above can be realized by this means as well.

The invention additionally relates to a product line with multiple communication modules of the type described above, wherein the communication modules of the product line each have the same internal communication protocol and/or physical layer, but have different external communication protocols and/or physical layers. By means of such a product line, electronic devices with a communication module replacement capability can be matched as needed to different external communication protocols and/or physical layers.

The product line can be augmented by a communication module that has, as external communication protocol and/or physical layer, the same communication protocol and/or physical layer as the internal communication protocol and/or physical layer. This communication module can be designed without a separate control processor, for example.

If, for example, the IO-Link protocol is used as the external communication protocol, the communication module can be equipped to perform the following functions:

Start phase: parameterization and initialization of IO-Link communication with data that are read out from the electronic device (identification block).

Process data: cyclic Modbus queries, synchronized with IO-Link queries or asynchronous to IO-Link queries.

Parameter data: translation and back-translation from IO-Link to Modbus; for this purpose, conversion of 10-Link indices to Modbus addresses through constant offset, mapping of Modbus error messages to IO-Link error messages, forwarding of events to IO-Link master.

Block Parameterization—BP: communication module places electronic device in BP state when it has received an IO-Link BP start command. Electronic device does not adopt written parameter values directly into the active configuration, but instead buffers them. Written parameter values become active when BP stop command is sent and none of the write queries during the BP was invalid. Result of the BP is sent to IO-Link master.

Data Storage—DS: on request from the IO-Link master, communication module reads indices from electronic device (fixed address) and assembles the DS_IndexList that is made available to the IO-Link master. Communication module places electronic device in BP state (electronic device handles following queries as for block parameterization) when parameter set is written. Handled as normal read queries when parameter set is read. Provision of CRC of the parameter set from electronic device.

The electronic device has terminals for delivery of the electrical energy for supplying energy to the electrical components (loads). These terminals can also be referred to as power supply output terminals of the electronic device. According to an advantageous embodiment, the electronic device has, as an additional terminal, at least one controllable digital or analog output terminal and/or at least one digital or analog input terminal. In the case of a controllable digital or analog output terminal, the terminal can be controlled by the external computer device through the communication unit. In the case of a digital or analog input terminal, an input value from this input terminal can be read out by the external computer device through the communication unit. This has the advantage that at least a simple remote I/O functionality can additionally be provided through the electronic device. The digital or analog output terminal is accordingly an output of such a remote I/O unit, and the digital or analog input terminal an input of such a remote I/O unit. Accordingly, at least simple control and monitoring tasks can be carried out with the electronic device, so that in many cases no additional I/O module is required in the system. In this case, already-existing I/O terminals of the electronic device that, for example, are present in any case for certain standard functions such as indicating the correct voltage level ("DC OK") can be used to implement the digital or analog input terminal and/or the digital or analog output terminal. Accordingly, the necessary hardware expense for the electronic device is not increased when the stated remote I/O functionality is provided.

As a result of this remote I/O functionality, the electronic device can function as a digital remote station that can be used by means of the data communication for status or functional monitoring, for example. This remote I/O functionality can be realized through a software extension alone, which is to say through corresponding code of the computer program. Consequently, no additional hardware is required.

If the digital or analog input terminal is designed as a digital input terminal, then only binary input values (0 and 1) are provided. If the digital or analog input terminal is designed as an analog input terminal, then input values with a specific range of values are provided, for example at 8 bits (0 to 255) or 12 bits (0 to 4095), depending on the resolution of an analog-to-digital converter employed.

If the digital or analog output terminal is designed as a digital output terminal, then only binary output values (0 and 1) can be set. If the digital or analog output terminal is designed as an analog output terminal, then output values with a specific range of values are provided, for example at 8 bits (0 to 255) or 12 bits (0 to 4095), depending on the resolution of a digital-to-analog converter employed.

The electronic device can have exactly one controllable digital or analog output terminal. The expense for the remote I/O functionality is minimized in this way, since a single controllable digital or analog output terminal is generally necessary in such an electronic device in any case.

The electronic device can have exactly one digital or analog input terminal. The expense for the remote I/O functionality is minimized in this way, since a single controllable digital or analog input terminal is generally necessary in such an electronic device in any case.

The electronic device can have a parameter memory, in which parameters can be stored for defining the functionality of the electronic device, wherein the functionality of the digital or analog input terminal can be set and/or the functionality of the controllable digital or analog output terminal can be set by at least one parameter. This has the advantage that the functionality of the digital or analog input terminal or of the digital or analog output terminal is user-selectable and accordingly can be set. Flexibility in the use of the electronic device is further improved by this means. The functionality of the digital or analog input terminal can be switched between two different functions or a higher number of different functions, for example. The functionality of the digital or analog output terminal can be switched between two functions or a higher number of functions, for example.

The functionality of the digital or analog input terminal can be set by means of at least one parameter to a minimum of one predetermined standard input function and/or the functionality of the controllable digital or analog output terminal can be set by means of at least one parameter to a minimum of one predetermined standard output function. This simplifies selection of the functionality of the digital or analog input terminal or of the digital or analog output terminal for the user.

The standard output function can be the output at the controllable digital or analog output terminal of a signal that indicates whether the voltage of the electronic device delivered at the terminals for delivery of electrical energy is in a permissible range. Accordingly, the digital or analog output terminal can be set to a standard function as a "DC OK" terminal.

The standard input function can be a remotely controllable switching on/switching off, through the digital or analog input terminal, of the electronic device or of the energy delivered at the terminals for delivery of electrical energy. Accordingly, the digital or analog input terminal can be used in the standard function as a remote control terminal for the electronic device.

The electronic device can have at least one electronic overcurrent circuit breaker realized in software by means of the computer program. Advantageously, the electronic device can thus be enhanced with an overcurrent circuit breaker functionality realized at least substantially in software. An electronic device and an at least single-channel electronic circuit breaker functionality are therefore combined within a single device. This has the advantage that an external overcurrent circuit breaker (circuit breaker) can normally be dispensed with. The user can save costs and installation space as a result. Moreover, the flexibility is increased for the user. Moreover, the external wiring is simplified because no additional wiring effort for an external overcurrent circuit breaker is required.

The electronic overcurrent circuit breaker can be realized solely through the computer program with no additional hardware components. Consequently, the hardware that is already on hand in the electronic device in any case is used in order to realize the functionality of the electronic overcurrent circuit breaker. Thus, in order to be fully functional, the circuit breaker software can use only the hardware that is also used by the software for controlling the electronic device, or specifically the energy supply device, itself.

The electronic overcurrent circuit breaker can include a function for shutting down the output current delivered by the electronic device and/or a function for limiting the output current delivered by the electronic device to a predetermined current value. The shutdown here can include a persistent shutting down of the output current or a temporary (short-term) shutting down of the output current. The same applies for the limiting of the output current, which can be a choice of persistent or temporary. The function of the electronic overcurrent circuit breaker can also include switching between the shutting down of the output current and limiting of the output current.

The shutdown of the output current delivered by the electronic device or the limiting of the output current delivered by the electronic device can be accomplished through primary-side control of the electronic device. For example, the main converter, e.g., the transformer, can controlled directly on the primary side. This permits simple realization of the electronic overcurrent circuit breaker functionality. Thus the energy supply, and hence the delivery of the output current, can be stopped or set to a lower value in that the actual main converter of the electronic device is no longer actively driven on the primary side.

To realize the electronic overcurrent circuit breaker functionality, the electronic device can have a current measurement in the output path. By means of the current measurement, it is possible to determine whether the output current is too high and accordingly the electronic overcurrent circuit breaker must trip in order to accomplish the shutdown or the limiting of the output current.

The electronic overcurrent circuit breaker can have a monitoring of the output current delivered by the electronic device for exceedance of a current limit value, wherein a shutdown of the output current or a limiting of the output current to a predetermined current value, e.g., the current limit value, takes place when the current limit value is exceeded. The output current delivered can be determined through the current measurement mentioned. Whether the measured output current exceeds the current limit value can be compared by means of the processor. Accordingly, the processor can initiate appropriate countermeasures, as for example shutdown of the output current or limiting of the output current.

The shutdown of the output current or the limiting of the output current only can take place after a predetermined tripping time during which the output current exceeds the current limit value continuously or for the majority of the time. This has the advantage that the electronic overcurrent circuit breaker functionality does not necessarily trip for every slight, brief exceedance of the current limit value, but instead only after the predetermined tripping time.

The electronic device can have a parameter memory in which parameters can be stored for defining the functionality of the electronic device, wherein the electronic overcurrent circuit breaker is configurable as desired by the user through one or more settable parameters in the parameter memory. This has the advantage that the circuit breaker functionality can be matched to the needs of the user. In particular, the tripping time and/or the current limit value can be settable as parameters. The capability to set the tripping time makes it possible to set both "fast-acting" and "slow-acting" circuit breaker characteristics as options.

The parameters in the parameter memory of the electronic device can be set through the communication unit by means of the external computer device. As a result, it is also possible to set the circuit breaker functionality remotely. Moreover, a simple possibility for changing the parameters is provided.

The tripping of the overcurrent circuit breaker, e.g., the triggering of the limiting and/or shutdown of the output current delivered, can be signaled through an illuminated indicator and/or through a communication interface. Illuminated signal indicators, such as LEDs, that are present in any case and that in normal operation indicate the load of the electronic device can advantageously be used for this purpose. Special states such as, for example, the circuit breaker functionality can also be signaled through different blink codes (outside of normal operation), however. The above-mentioned communication unit of the electronic device can be used as the communication interface.

The electronic device can have a logging function, in which the activity of the electronic overcurrent circuit breaker functionality is logged. For example, it is possible to log when and for how long the shutdown of the output current and/or a limiting of the output current is performed by the electronic overcurrent circuit breaker. The log file can be read out by an external computer device through the communication unit of the electronic device. Improved diagnostic options for the user are provided by this means.

The electronic device can have a housing on which are arranged mounting rail fastening elements through which the electronic device can be attached to a mounting rail for electrical installation. In this way, the electronic device can be attached to the mounting rail like other components of an industrial control system, e.g., mounted in a row next to other devices. The electronic device can be snapped onto the mounting rail, for example.

For the purposes of the present invention, the indefinite article "a" is not to be understood as a number. Thus, for example, if reference is made to "a component," this is to be interpreted in the sense of "at least one component." If angles are specified in degrees, these specifications refer to a circular measurement of 360 degrees (360°). If a processor is mentioned, it can be equipped to execute a computer program, e.g., in the sense of software. The processor can be designed as a commercially available computer, e.g., as a PC, laptop, notebook, tablet or smartphone, or as a microprocessor, microcontroller, or FPGA, or as a combination of such elements. If regulation is mentioned, regulation differs from control in that regulation has a feedback or back-coupling of measured or internal values with which the output values produced by the regulation are in turn influenced in the sense of a closed control loop. In the case of control, a variable is controlled purely without such feedback or back-coupling.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
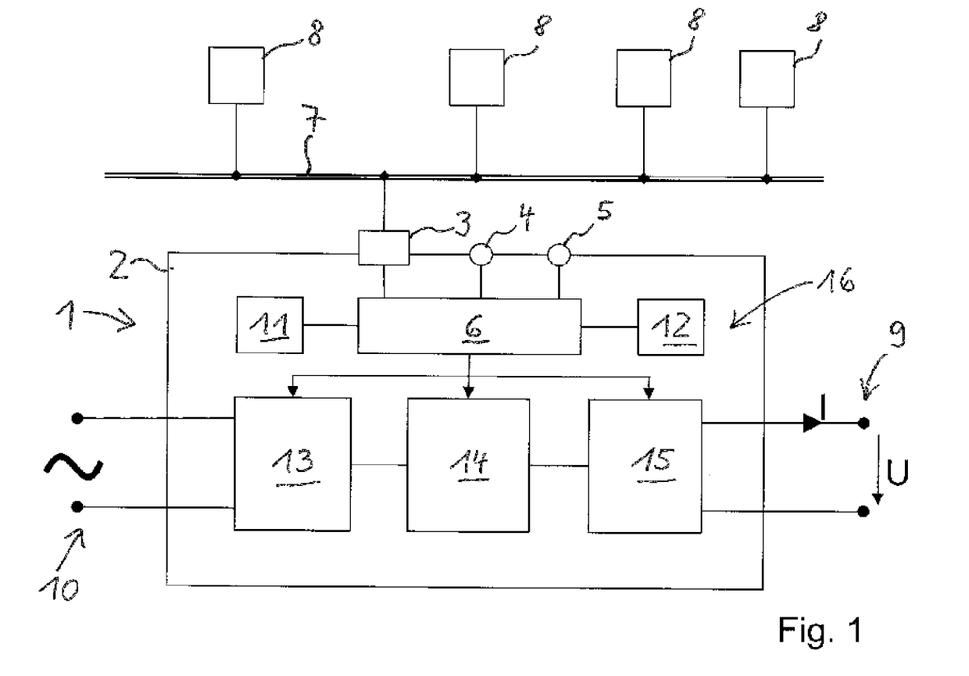
FIG. 1 is an electronic device in a schematic representation.

FIG. 1 shows an electronic device 1, which has a housing 2. Control electronics 16 of the electronic device 1 are arranged in the housing 2. Also located in the housing 2 are power electronics components 13, 14, 15. The electronic device has input terminals 10, with which the electronic device 1 can be connected to a power grid, for instance an AC power grid. The electronic device 1 serves to convert the electrical energy drawn from the power grid through the input terminals 10 into electrical energy delivered on the output side, which is provided at energy supply output terminals 9. For example, an output current I with an output voltage U, for example a DC voltage, can be provided at the energy supply output terminals 9.

The power electronics components 13, 14, 15 can include primary-side components 13 and secondary-side components 15. In addition, a transformer 14 can be present between the primary-side components 13 and the secondary-side components 15.

The control electronics 16 have a processor 6, a program memory 11, and a parameter memory 12. The processor 6 is connected to the program memory 11 and to the parameter memory 12. Stored in the program memory 11 is a computer program. The computer program has software control functions for controlling power supply functions of the electronic device 1, for example regulating functions for keeping the output voltage U and/or the output current I constant. Stored in the parameter memory 12 are parameters for user-specific definition of the functionality of the electronic device, e.g., in order to select various options or subfunctions in the software control functions. The processor 6 executes the computer program and in doing so takes into account relevant parameters from the parameter memory 12. In this process, the processor 6 controls the power electronics components 13, 14, 15 in such a manner that a desired output current I and/or a desired output voltage U is provided at the energy supply output terminals 9.

The processor performs an electronic overcurrent circuit breaker functionality and/or a remote I/O function through additional software functions present in the computer program, as explained above.

With respect to the remote I/O function, the processor 6 is connected to additional terminals of the electronic device, which include at least one controllable digital or analog output terminal 4 and at least one digital or analog input terminal 5. The processor 6 can read in an input signal, for example a digital value or an analog value, through the digital or analog input terminal 5. The processor 6 can deliver a digital or analog output signal at the output terminal 4. The terminals 4, 5 need not be connected directly to the processor 6 in this case, but instead can be decoupled therefrom through suitable interface circuits.

The processor 6 is also connected to a communication unit 3. The processor 6, and thus the electronic device 1, can carry out data communication with external computer devices 8 through the communication unit 3. In the exemplary embodiment shown, the computer devices 8 are connected to a data bus 7. The electronic device 1 is likewise connected through its communication unit 3 to the data bus 7. In this way, data communication can take place between the electronic device 1 and the external computer devices 8.

In the case of remote I/O functionality, an external computer device 8 can control the digital or analog output terminal 4 through the communication unit 3. In this case, the processor 6 receives a control command from the external computer device 8 through the communication unit 3 and drives the digital or analog output terminal 4 in accordance with the control command. An external computer device 8 can read out an input value from the digital or analog input terminal 5 through the communication unit 3. In this process, the processor 6 receives a readout command from the external computer device 8 through the communication unit 3, reads in the input value from the digital or analog input terminal 5, and transmits the input value to the external computer device 8 through the communication unit 3 by means of a response message. Moreover, the functionality of the digital or analog output terminal 4 and/or of the digital or analog input terminal 5 can be set through parameters stored in the parameter memory 12.

Figure 2:
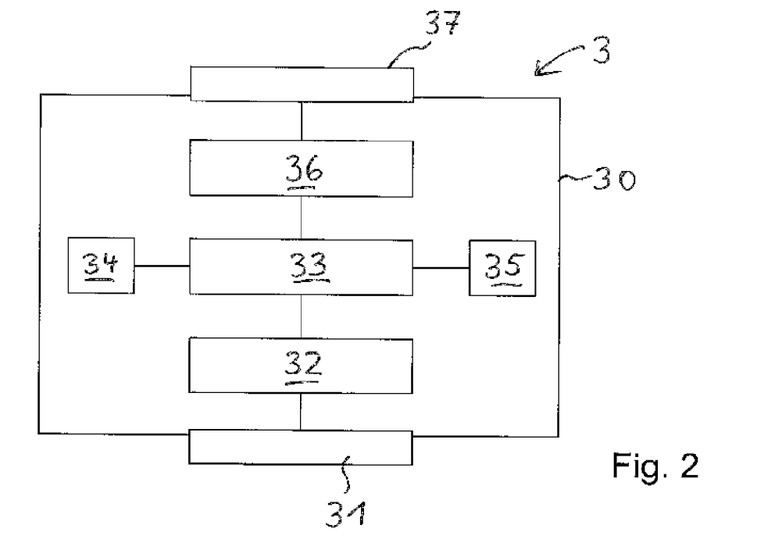
FIG. 2 is a communication module in a schematic representation.

The communication unit 3 shown in FIG. 1 can be designed as a replaceable communication module 30, as shown in FIG. 2, for example. The communication module 30 has an electrical plug-and-socket connection 31 with which the communication module 30 can be electrically connected to the electronic device 1 and in particular its control electronics 16. The communication module 30 has an additional electrical plug-and-socket connection 37 with which the communication module 30 can be connected directly or indirectly to an external computer device 8, for example through the data bus 7.

A separate control processor 33 can be present in the communication module 30. In this case it is advantageous when the communication module 30 has a separate program memory 34 and, if appropriate, also a separate parameter memory 35, wherein these memories are each connected to the control processor 33 so that the control processor 33 can access the memory contents.

The communication module 30 has a gateway functionality by means of which a bidirectional conversion takes place between an external communication protocol and/or physical layer used by the external computer device 8 and an internal communication protocol and/or physical layer used between the communication module 30 and the processor 6. This bidirectional conversion is essentially executed and controlled by the control processor 33 here. For this purpose, the control processor 33 is connected on the one hand to the plug-and-socket connection 31, for example through an internal hardware interface 32, and on the other hand to the additional plug-and-socket connection 37, for example through an external hardware interface 36. A hardware-based signal matching between the control processor 33 and the internal physical layer employed can take place through the internal hardware interface 32. A hardware-based signal matching between the control processor 33 and the external physical layer employed can take place through the external hardware interface 36.

The structure of the communication module 30 explained on the basis of FIG. 2 is especially advantageous when the internal communication protocol and the external communication protocol differ significantly and the gateway functionality is complex enough that a separate control processor 33 is necessary. If the differences between the internal and the external communication protocols are not very great or even the same communication protocols are used, then the communication module 30 can also be designed without a separate control processor 33. In this case, the program memory 34 and the parameter memory 35 can also be omitted. If appropriate, the internal hardware interface 32 can also be dispensed with, or it can be implemented in combination with the external hardware interface 36.

Figure 3:
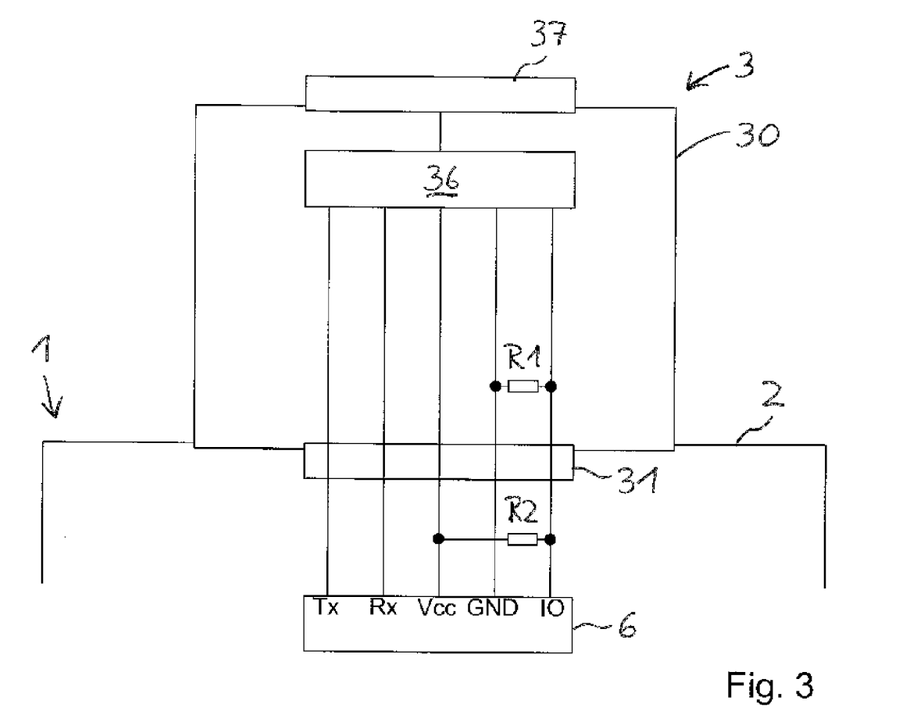
FIG. 3 is an arrangement consisting of an electronic device and a communication module in a schematic representation.

FIG. 3 shows such an embodiment of a communication module 30 in connection with a detail view of the electronic device 1. The communication module 30 is designed without a separate control processor in this case. Essentially, the communication module 30 then has only the external hardware interface 36. Depending on the embodiment, it may be the case that certain drive functions of the external hardware interface 36 must nevertheless be processor-controlled, which is not possible in the communication module 30 due to the lack of a separate control processor there. An advantageous embodiment in this regard is described on the basis of FIG. 3, in which this processor-controlled driving of the external hardware interface 36 can be accomplished through the processor 6 of the electronic device 1.

An interface connection between the processor 6 and the external hardware interface 36, which can be designed in the form of a serial interface with a transmit line Tx and a receive line Rx, for example, is illustrated. In addition, electrical energy supply lines Vcc (operating voltage for the hardware interface 36) and GND (ground line) are shown. An I/O port from the processor 6 is also shown, which can be operated both as an output terminal and as an input terminal. If the I/O port is operated as an output terminal, then the processor 6 can control a control terminal of the external hardware interface 36 in this way, for example in order to set the data transfer direction transmit/receive. If the I/O port is operated as an input terminal, then a digital or analog signal can be read in through it.

FIG. 3 shows a hardware-based detection circuit through which the control electronics 16 or the processor 6 can detect whether a communication module 30 with a separate control processor 33 or a communication module 30 with no separate control processor 33 is connected to the electronic device 1. As a result, the processor 6 can automatically determine whether or not it must perform the control functions through the output signals of the I/O port.

The hardware-based detection circuit in this case has a resistor R2 built into the electronic device 1, creating a connection between Vcc and the I/O port (pull-up resistor). An additional resistor R1, which creates a connection between GND and the I/O port (pull-down resistor), is present in the communication module 30. On the basis of a voltage level read in through the I/O port, which arises on account of the resistance ratio R1/R2, the processor 6 can detect that a communication module 30 with no separate control processor is connected. A corresponding communication module 30 with a separate control processor would be designed without such a resistor R1 so that a different voltage level then arises at the I/O port, which the processor 6 can likewise detect.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electronic device comprising:
   control electronics that have at least one program memory with a computer program stored therein;

a processor to execute the computer program, wherein the computer program has software control functions for controlling functions of the electronic device; and at least one communication unit coupled to the control electronics via which the electronic device is equipped for data communication with an external computer device, wherein the at least one communication unit is designed as a replaceable communication module, wherein the replaceable communication module has a gateway functionality via which a bidirectional conversion takes place between an external communication protocol and/or physical layer used by the external computer device and an internal communication protocol and/or physical layer used between the replaceable communication module and the processor, wherein the replaceable communication module supports either exactly one external communication protocol or multiple external communication protocols, and wherein the external communication protocol and/or physical layer supported by the gateway functionality of the replaceable communication module are exchangeable by removing the replaceable communication module from the electronic device and connecting a second replaceable communication module to the electronic device, the second replaceable communication module having a second gateway functionality that supports a second external communication protocol and/or physical layer that is different from the external communication protocol and/or physical layer of the replaceable communication module.

2. The electronic device according to claim 1, wherein the replaceable communication module is equipped to read out an identifier that specifies a device type of the electronic device from the control electronics of the electronic device through the internal communication protocol and to transmit the device type to the external computer device through the external communication protocol.

3. The electronic device according to claim 1, wherein the replaceable communication module is equipped to convert a command for block parameterization of the control electronics, that is received from the external computer device through the external communication protocol, into the internal communication protocol so that the control electronics is written with a plurality of parameters via the command for block parameterization.

4. The electronic device according to claim 1, wherein the replaceable communication module is equipped to convert a data storage command received from the external computer device through the external communication protocol into selected functions of the internal communication protocol, in one or multiple steps, wherein parameter data of the control electronics are read out by the replaceable communication module and transferred to the external computer device and/or parameter data from the external computer device are written into the control electronics through the replaceable communication module.

5. The electronic device according to claim 1, wherein the replaceable communication module is equipped to convert a data write command received from the external computer device through the external communication protocol into selected functions of the internal communication protocol, in one or multiple steps, wherein previously stored parameter data of an electronic device of the same type from the external computer device are stored on the electronic device by the replaceable communication module, wherein any existing data may be overwritten.

6. The electronic device according to claim 1, wherein the replaceable communication module has or permits password protection, so that the external computer device communicating with the electronic device through the replaceable communication module must perform a password authentication at least when accessing certain functions of the control electronics.

7. The electronic device according to claim 1, wherein the electronic device is designed as an electrical energy supply device for supplying electrical energy to electrical components from an energy source and/or as an electronic circuit breaker.

8. The electronic device according to claim 7, wherein the electrical energy supply device is designed as a power supply unit of an industrial controller of a programmable control system, as a switched-mode power supply, and/or as an uninterruptible power supply.

9. The electronic device according to claim 1, wherein the replaceable communication module is adapted to be plugged into a housing of the electronic device externally via an electrical plug-and-socket connection.

10. An electronic device comprising:
control electronics that have at least one program memory with a computer program stored therein;
a processor to execute the computer program, wherein the computer program has software control functions for controlling functions of the electronic device; and
at least one communication unit coupled to the control electronics via which the electronic device is equipped for data communication with an external computer device, wherein the at least one communication unit is designed as a replaceable communication module,
wherein the replaceable communication module has a gateway functionality via which a bidirectional conversion takes place between an external communication protocol and/or physical layer used by the external computer device and an internal communication protocol and/or physical layer used between the replaceable communication module and the processor,
wherein the replaceable communication module supports either exactly one external communication protocol or multiple external communication protocols, and
wherein the electronic device has a hardware-based detection circuit via which the control electronics detect whether the replaceable communication module that is connected to the electronic device has a separate control processor or does not have a separate control processor.

11. The electronic device according to claim 1, wherein the external communication protocol is a bus protocol or a Peer-to Peer (P2P) protocol that supports the data communication of multiple of the external computer device that are connected to a common data bus.

12. A communication unit of the electronic device according to claim 1, wherein the communication unit is designed as the replaceable communication module, wherein the replaceable communication module has the gateway functionality via which the bidirectional conversion takes place between the external communication protocol and/or physical layer used by the external computer device and the internal communication protocol and/or physical layer used between the replaceable communication module and the processor, wherein the replaceable communication module supports either exactly one of the external communication protocol or multiple of the external communication protocol, and wherein the external communication protocol and/or physical layer supported by the gateway functionality of the replaceable communication module are exchangeable by removing the replaceable communication module from the electronic device and connecting the second replaceable communication module to the electronic device, the second replaceable communication module having the second gateway functionality that supports the second external communication protocol and/or physical layer that is different from the external communication protocol and/or physical layer of the replaceable communication module.

13. A product line comprising a plurality of the communication units according to claim 12, such that a plurality of the replaceable communication modules are provided, wherein the replaceable communication modules of the product line each have the same internal communication protocol and/or physical layer, but have different external communication protocols and/or physical layers.

14. The product line according to claim 13, wherein the product line is augmented by another replaceable communication module that has, as an external communication protocol and/or physical layer that is the same as an internal communication protocol and/or physical layer.

* * * * *